United States Patent
Ding

(10) Patent No.: US 9,900,927 B2
(45) Date of Patent: *Feb. 20, 2018

(54) SYSTEM AND METHOD FOR MANAGING STATE TRANSITIONS IN A WIRELESS COMMUNICATIONS NETWORK

(71) Applicant: Telefonaktiebolaget L M Ericsson (publ), Stockholm (SE)

(72) Inventor: Wayne Ding, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 485 days.

This patent is subject to a terminal disclaimer.

(21) Appl. No.: 14/560,020

(22) Filed: Dec. 4, 2014

(65) Prior Publication Data
US 2015/0085673 A1   Mar. 26, 2015

Related U.S. Application Data

(63) Continuation of application No. 13/467,817, filed on May 9, 2012, now Pat. No. 8,937,880.

(51) Int. Cl.
*H04L 12/26* (2006.01)
*H04W 76/04* (2009.01)

(52) U.S. Cl.
CPC .................. *H04W 76/046* (2013.01)

(58) Field of Classification Search
USPC ....... 370/229, 230, 235, 236, 252, 311, 328, 370/395.2, 395.21, 395.3
See application file for complete search history.

(56) References Cited

U.S. PATENT DOCUMENTS

| | | | |
|---|---|---|---|
| 7,023,825 B1 | 4/2006 | Haumont et al. | |
| 7,436,779 B1 | 10/2008 | Mangal et al. | |
| 7,843,853 B2 | 11/2010 | Lin | |
| 7,904,025 B2 | 3/2011 | Jung | |
| 8,385,350 B2 | 2/2013 | Shahidi et al. | |
| 8,937,880 B2* | 1/2015 | Ding | H04W 76/046 370/235 |
| 2002/0172178 A1* | 11/2002 | Suzuki | H04W 76/068 370/338 |
| 2004/0013089 A1* | 1/2004 | Taneja | H04L 12/5695 370/235 |
| 2007/0248060 A1* | 10/2007 | Mooney | H04L 12/5695 370/338 |

(Continued)

FOREIGN PATENT DOCUMENTS

| | | |
|---|---|---|
| EP | 2341687 A1 | 7/2011 |
| WO | 2011060998 A1 | 5/2011 |
| WO | 2011098163 A1 | 8/2011 |

*Primary Examiner* — Kwang B Yao
*Assistant Examiner* — Nguyen Ngo
(74) *Attorney, Agent, or Firm* — Coats & Bennett, PLLC

(57) ABSTRACT

A system and method is disclosed for individually controlling User Equipment (UE) connections, dynamically and automatically, based on the applications and/or services that the connections carry. An eNodeB or other radio base station (RBS) monitors established connections between the UE and the RBS to detect applications running within those connections. Based on the stateful information of applications, the present invention proactively controls the state transitions of individual UEs between the CONNECTED and IDLE states thereby increasing radio link capacity and reducing control plane loading.

28 Claims, 8 Drawing Sheets

(56) References Cited

U.S. PATENT DOCUMENTS

| | | | |
|---|---|---|---|
| 2008/0304510 A1* | 12/2008 | Qu ...................... | H04W 76/064 370/463 |
| 2011/0069685 A1* | 3/2011 | Tofighbakhsh ..... | H04L 41/5067 370/338 |
| 2011/0207465 A1* | 8/2011 | Dwyer ................ | H04W 76/046 455/450 |

* cited by examiner

SYSTEM AND METHOD FOR MANAGING STATE TRANSITIONS IN A WIRELESS COMMUNICATIONS NETWORK

RELATED APPLICATIONS

The present application is a continuation of U.S. patent application Ser. No. 13/467,817, which was filed on May 9, 2012, and is incorporated by reference herein in its entirety.

FIELD OF THE INVENTION

The present invention relates generally to Radio Access Network (RAN) technologies for a wireless communications network, and more particularly to systems and methods for managing state transitions of User Equipment (UE) in the RAN.

BACKGROUND

User Equipment (UE) typically performs some initial procedures before they can communicate with remote devices over a wireless communications network. Such procedures include, for example, tuning and synchronizing to a Radio Base Station (RBS) in the RAN, and registering with a mobility management entity. Once registered or "attached" to the network, the UE switches between an "IDLE" state and a "CONNECTED" state, as needed, to communicate data. In the IDLE state, the UE remains registered with the network, but is not active—i.e., there is no incoming or outgoing user data to/from the UE. In the CONNECTED state, the UE can exchange user data and signaling with the RBS in the RAN. Once finished transmitting and/or receiving data, the UE moves back to the IDLE state after a predetermined time period of inactivity.

In conventional RAN technologies, the network manages the transitions from the CONNECTED state to the IDLE state for all UEs using a single, manually configured Inactivity Timer. Specifically, after no activity is detected for a given UE for a fixed and pre-defined period of time, the UE is moved to the IDLE state. Inactivity timers are useful because they help ensure that the UEs will not continue to tie up resources they are not currently using. However, such a "global" inactivity timer can also be problematic. For example, configuring an optimized value for the inactivity timer is not straightforward. In many cases, there is often a trade off between the desire for increased radio link capacity and desire to minimize control plane loading. Setting the inactivity timer for too long a value could mean that the existing connections will continue to occupy the same radio resources that were allocated when the connection was initially established. Further, the resources continue to be occupied until the timer expires, even though the UEs have no data or signaling to send or receive. This can greatly impact radio link capacity, which is often measured by the number of simultaneous connected UEs.

On the other hand, setting the inactivity timer for too short a value could mean that the radio resource control (RRC) connections get torn down prematurely. When this occurs, the RRC connections must be quickly re-established very frequently, leading to rapid changes for the UE between the CONNECTED and IDLE states. This behavior may be particularly troublesome in situations where the UEs are running chatty applications, such as messaging. More particularly, such "flip-flop" state transitions can significantly increase the control plane loading due to the frequent connection terminations and re-establishments.

With the ever-increasing penetration of the Smartphone into the market, as well as the numbers and different types of software applications created for such devices, it is getting more difficult to configure a single inactivity timer with a fixed value that is applicable to all subscribers and/or all the time. Conventional RANs have no means to proactively control the state transition of the UEs individually, regardless of the type or kind of applications/services a given UE is using.

SUMMARY

The present invention provides a system and method for individually controlling each User Equipment (UE) connection, dynamically and automatically, based on the applications and/or services that the connections associated with a given UE carry at a given period of time. More specifically, the present invention monitors established connections between the UE and the RBS to detect application types and their corresponding session states running within those connections. Based on the stateful information of applications, the present invention proactively manages or controls the state transitions of individual UEs between the CONNECTED and IDLE states thereby increasing radio link capacity and reducing control plane loading.

Accordingly, one embodiment of the present invention provides a method for managing connection state transitions in a wireless communications network. The method is performed at a radio base station (RBS) and comprises maintaining session state information (SSI) for a user equipment (UE) communicatively connected to the RBS, maintaining flow information for each of one or more application flows for the UE, and transitioning the UE between a first Radio Resource Control (RRC) connection state and a second RRC connection state based on the current SSI and the flow information for an application flow.

In one embodiment, the method further comprises monitoring each of the one or more application flows for the UE, and generating the flow information responsive to detecting the application flow.

Monitoring each of the one or more application flows for the UE may comprise classifying each of the one or more application flows to identify an application type for each application flow, as well as to track a corresponding session state. Additionally, such monitoring comprises providing an application level gateway for each application type to monitor the application flows, and providing a default application level gateway to monitor application flows that are not classified.

In some embodiments, maintaining session state information for a UE comprises storing an identity and a current session state for the UE in a memory accessible to the RBS. Additionally, maintaining flow information for each of the one or more application flows comprises storing one or more of a source address, a destination address, a source port, a destination port, and a protocol type for each of the one or more application flows in the memory. The flow information for each application flow is associated with the SSI for the UE.

In one embodiment, transitioning the UE between the first and second RRC connection states comprises periodically transitioning the UE based on a type of application that is associated with the application flow, or responsive to a change in the session state for the application flow. The periodic transitioning of the UE may also comprise transitioning the UE between the first and second RRC connection states at predetermined intervals, which may be dynamically determined.

In other embodiments, transitioning the UE between a first RRC connection state and a second RRC connection state further may be based on a determined system load, a time of day, or on a type of UE.

In one embodiment, transitioning the UE between a first RRC connection state and a second RRC connection state comprises transitioning the UE from an IDLE state to a CONNECTED state responsive to detecting the application flow at the RBS.

In other embodiments, transitioning the UE between a first RRC connection state and a second RRC connection state comprises transitioning the UE from a CONNECTED state to an IDLE state responsive to detecting that a session associated with the application flow has ended.

Additionally, in some embodiments, the present invention configures an aging timer for each of the one or more application flows for the UE, and transitions the UE from a CONNECTED state to an IDLE state responsive to detecting expiration of the aging timer.

In addition, the present invention also provides a radio base station (RBS) in a wireless communications network. The RBS includes a communications interface configured to transmit signals to and receive signals from a plurality of user equipment (UEs) and a programmable controller circuit. The controller circuit, in one embodiment, is configured to maintain session state information (SSI) in a memory for a UE communicatively connected to the RBS via the communications interface, maintain flow information in the memory for each of one or more application flows for the UE, and transition the UE between a first RRC connection state and a second RRC connection state based on the current SSI and the flow information for an application flow.

In some embodiments, the controller circuit is further configured to monitor each of the one or more application flows for the UE, and generate the flow information responsive to detecting the application flow.

In one embodiment, the controller circuit is further configured to classify each of the one or more application flows to identify an application type for each application flow, and to track a corresponding session state for each of the one or more application flows, control an application level gateway for each application type to monitor the application flows, and control a default application level gateway to monitor application flows that are not classified.

The controller circuit may also be further configured to store an identity and a current session state for the UE in the memory, store one or more of a source address, a destination address, a source port, a destination port, and a protocol type for each of the one or more application flows in the memory, and associate the flow information for each application flow with the SSI for the UE.

In one embodiment, the controller circuit is further configured to periodically transition the UE between RRC connection states based on a type of application that is associated with the application flow, or responsive to a change in the session state for the application flow.

Additionally, the controller circuit may further be configured to transition the UE from the first RRC connection state (e.g., the IDLE state) to the second RRC connection state (e.g., the CONNECTED state) responsive to detecting the application flow at the RBS and/or detecting that a session associated with the application flow has ended. Similarly, the controller circuit is also configured to configure an aging timer for each of the one or more application flows for the UE. Based on the timer, the controller circuit can transition the UE from the second RRC connection state (e.g., the CONNECTED state) to the first RRC connection state (e.g., the IDLE state) responsive to detecting expiration of the aging timer.

In another embodiment, the present invention provides a computer readable medium having a program stored thereon that, when executed by a controller circuit in a radio base station (RBS), causes the RBS to maintain session state information (SSI) in a memory accessible to the RBS for a user equipment (UE) communicatively connected to the RBS, maintain flow information in the memory for each of one or more application flows for the UE, and transition the UE between a first RRC connection state and a second RRC connection state based on the current SSI and the flow information for an application flow.

In one embodiment, the program is further configured to cause the RBS to monitor each of the one or more application flows for the UE, and generate the flow information responsive to detecting the application flow.

In one aspect of the invention, the program is further configured to cause the RBS to classify each of the one or more application flows to identify an application type for each application flow, and to track a corresponding session state for each of the one or more application flows, control an application level gateway for each application type to monitor the application flows, and control a default application level gateway to monitor application flows that are not classified.

The program may further be configured to cause the RBS to store an identity and a current session state for the UE in the memory, store one or more of a source address, a destination address, a source port, a destination port, and a protocol type for each of the one or more application flows in the memory, and associate the flow information for each application flow with the SSI for the UE.

In one or more embodiments, the program is further configured to cause the RBS to periodically transition the UE based on a type of application that is associated with the application flow, or responsive to a change in the session state for the application flow. For example, the program may be configured to cause the RBS to transition the UE from the IDLE state to the CONNECTED state responsive to detecting the application flow at the RBS, and then back to the IDLE state responsive to detecting that a session associated with the application flow has ended.

In one embodiment, the program is further configured to cause the RBS to configure an aging timer for each of the one or more application flows for the UE, and transition the UE from the CONNECTED state to the IDLE state responsive to detecting expiration of the aging timer.

In another embodiment, the present invention provides a session processing module comprising a means for maintaining session state information (SSI) for a user equipment (UE) communicatively connected to the RBS, a means for maintaining flow information for each of one or more application flows for the UE and a means for transitioning the UE between a first RRC connection state and a second RRC connection state based on the current SSI and the flow information for an application flow. The first state may be an IDLE state and the second state may be a CONNECTED state.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention takes advantage of flow-based or session-based processing. Such flow-state processing is a stateful processing, as opposed to stateless packet-based processing in which each packet being processed is individually assessed and treated.

More particularly, the present invention provides a system and method for dynamically and automatically controlling each individual User Equipment (UE) connection, based on the applications and/or services the connections carry. The present invention monitors the flow of information associated with one or more applications for each individual UE, and records the information carried in data packets for a given application flow. Such information includes, but is not limited to, source and/or destination IP addresses, source and/or destination ports, and protocol types. Then, based on the information within a given application flow, the present invention proactively controls the transitioning of each individual UE between the IDLE state and the CONNECTED state.

Such "flow-based" or "session-based" processing provides an advantage over conventional systems that cannot proactively control the state transitions of individual UEs based on application flow. For example, conventional systems and methods configure a single, "global" inactivity timer that specifies when all UEs move to an IDLE state. However, a UE operating under such a "one-size-fits-all" timer cannot release its resources and enter the IDLE state until the timer expires. Instead, the UE must hold on to its allocated resources until the timer expires. However, by monitoring the state of the application flow(s) for a given UE, the present invention enables a system to autonomously determine when the given UE is inactive. So informed, the system can proactively cause the UE to enter the IDLE state without waiting for a conventional "one-size-fits-all" inactivity timer to expire. As such, UEs are transitioned to a more appropriate state sooner thereby freeing precious resources and increasing link capacity.

Figure 1:
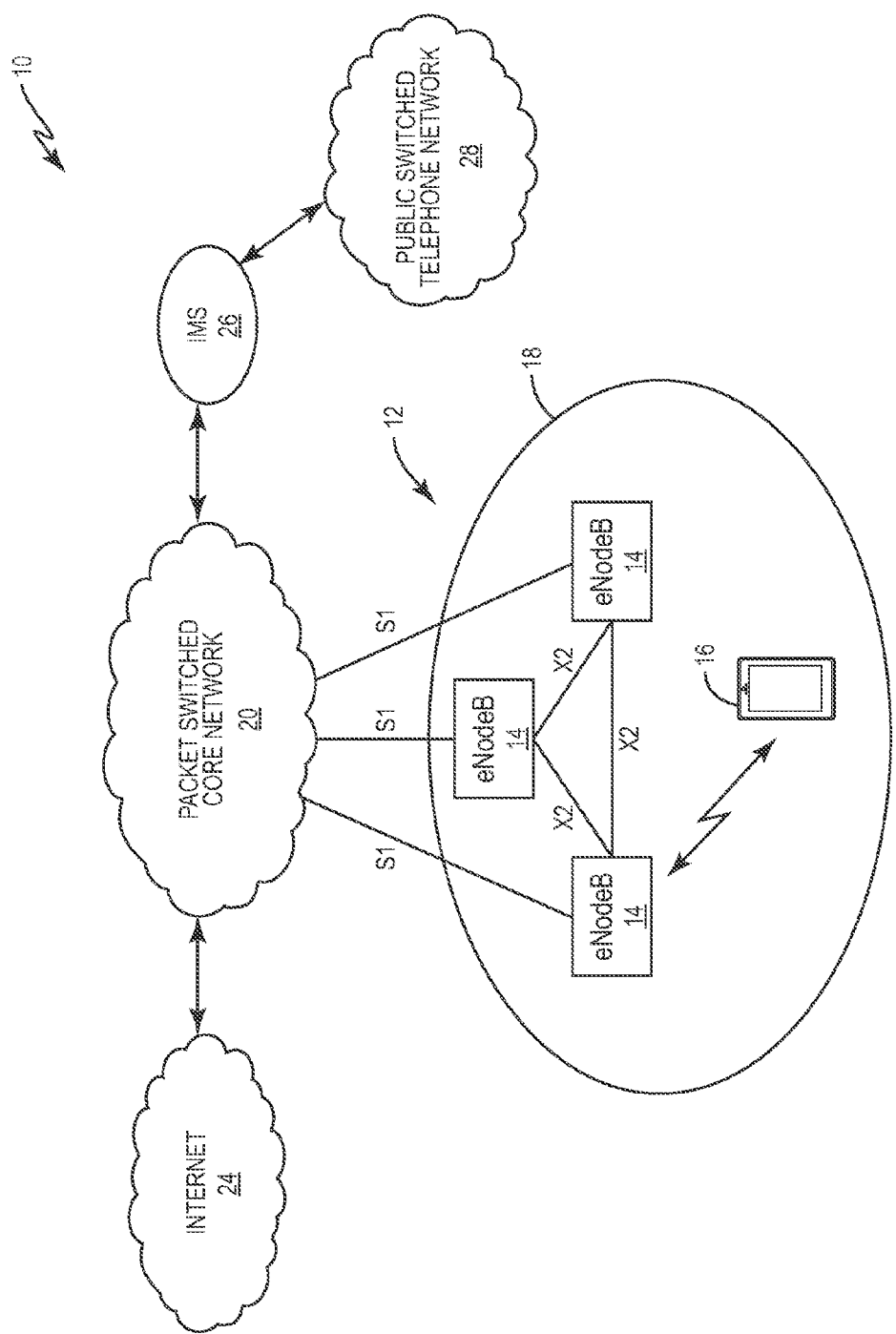
FIG. 1 is a functional block diagram of an LTE wireless communication network.

Turning now to the drawings, FIG. 1 illustrates a high-level, functional block diagram of a Long Term Evolution (LTE) wireless communication network 10 suitable for use in one embodiment of the present invention. Those skilled in the art will readily appreciate that, while FIG. 1 illustrates an LTE network specifically, it is for illustrative purposes only. The present invention may be utilized in networks other than the LTE network 10 seen in FIG. 1.

As seen in FIG. 1, a Radio Access Network (RAN) 12 (e.g., the Evolved Universal Terrestrial Radio Access Network, or E-UTRAN), comprises one or more radio base stations, or eNodeBs 14. Each eNodeB 14 provides wireless communication service to a plurality of User Equipment (UE) 16, such as a cellular telephone, for example, within a geographical area 18. The eNodeBs 14 communicatively connect to each other over a logical X2 interface, and to one or more nodes in a packet switched core network (PSCN) 20 over a logical S1 interface.

The PSCN 20 comprises a plurality of communicatively-linked nodes, such as a Mobility Management Entity (MME) (not shown) and Serving Gateway (S-GW) (not shown) that connect to the eNodeBs 14. The MME and S-GW, in turn, communicatively connect to a variety of other nodes, such as a Packet Data Network Gateway (PDN-GW) (not shown) to provide connectivity for the UE 16 to packet data networks such as the Internet 24, and to the Public Switched Telephone Network (PSTN) 28 via an IP Multimedia Subsystem (IMS) 26.

Figure 2:
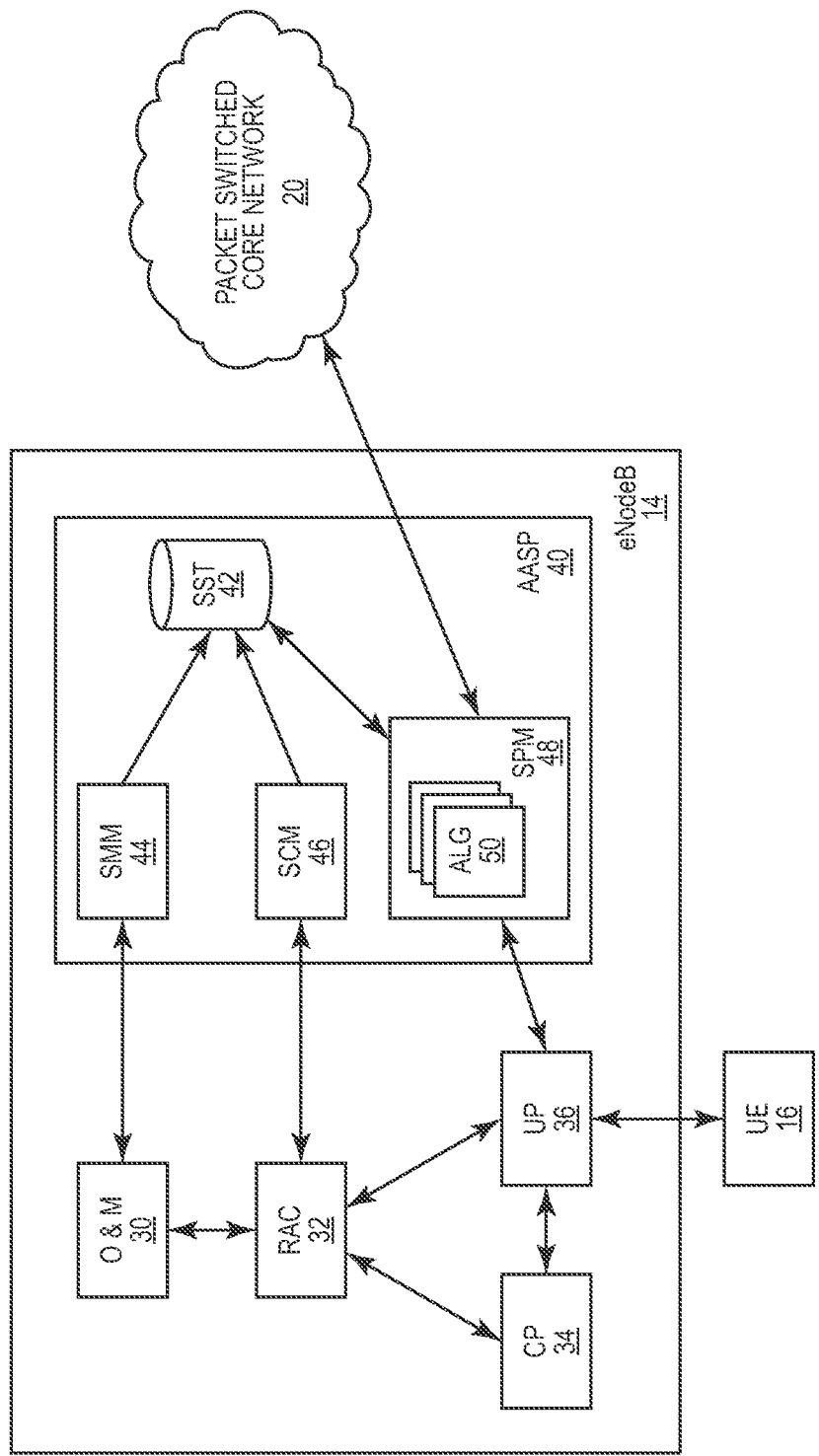
FIG. 2 is a functional block diagram of an eNodeB configured according to one embodiment of the present invention.

FIG. 2 is a functional block diagram of an eNodeB 14 configured according to one embodiment of the present invention. As seen in FIG. 2, the eNodeB 14 includes an Operation and Maintenance (O&M) module 30, a Radio Access Control (RAC) module 32, Control Plane (CP) functions 34, User Plane functions, 36, and an Application-Aware Session Processing (AASP) module 40. The AASP module 40, in turn, comprises a Session State Table (SST) 42, a Session Management Module (SMM) 44, a Session Control Module (SCM) 46, a Session Processing Module (SPM) 48, and one or more Application Level Gateway (ALG) modules 50 to monitor the application flows, as described in more detail below. Each of these functions and modules may be implemented as software, as hardware, and/or as a combination of software and hardware.

The O&M module 30 includes the hardware and/or software necessary to generally allow network operators to provision, configure, and maintain the operation of the eNodeB 14. Particularly, as is known in the art, network operators usually access the eNodeB 14 from a remote location. Once connected, the network operators can interact with the eNodeB 14 to add, delete, and otherwise manipulate data stored at the eNodeB 14 to support the services and functions provided by the eNodeB 14. In one embodiment of the present invention, users may interface with the SST 42 to manage data.

The RAC module 32 includes the functions and circuitry necessary for checking the availability of radio resources when establishing and configuring bearers. Generally, the RAC 32 handles the connection related signaling towards the UE 16, the control signaling towards MMEs and other RBSs, as well as the logic required to control the radio connections with the active UEs. The RAC 32 also manages the local radio network resources, such as cells and cell relations.

The RAC 32 is part of the more general overall admission control procedure that checks transport and hardware resources before admitting a new radio bearer or a radio bearer that is handed over from another eNodeB. Additionally, the RAC 32 is responsible for maintaining the overall load within a feasible region so that the RAN 12 remains stable and is able to deliver data and signaling to the UE 16 at an expected Quality of Service (QoS).

The CP functions 34 include the hardware and/or software required for signaling to occur between the UE 16 and the eNodeB 14. Such signaling includes, but is not limited to, Radio Resource Control (RRC) signaling and E-UTRAN signaling (e.g., connection management related signaling, and mobility management related signaling). As described in more detail later, the present invention utilizes a stateful processing method to proactively control the RRC connection state of the individual UEs thereby reducing the signaling load on the CP 34.

The UP functions 36 include the hardware and/or software needed for the UE 16 to communicate traffic data and signaling to the eNodeB 14 and one or more nodes in the PSCN 20. By way of example, the UE 16 may send data such as voice packets, data packets, and web content to the eNodeB 14 via the UP 36, but may also send signaling messages that are associated with certain application services such as those operating according to the Session initiation Protocol (SIP).

The AASP module 40, as stated above, includes a variety of hardware circuits and/or software function modules. In one embodiment of the present invention, the AASP 40 dynamically and automatically controls each UE RRC connection, individually, based on the data flow of the applications and/or services that the RRC connections carry. More specifically, as will be described in more detail later, the AASP 40 monitors, for each individual UE, the flow of data for applications and/or services for that UE and creates corresponding sessions. When a session is created, the information carried in the data packets associated with a given application flow, and the corresponding RRC connection state information, are stored in a table in memory, and indexed using unique identifiers. Such information includes, but is not limited to, source and/or destination IP addresses, source and/or destination ports, and protocol types. Based on the information in those application flows, the AASP module 40 proactively controls that UE to switch between an IDLE state, in which the UE is inactive and not communicating, and a CONNECTED state, in which the UE is active and communicating.

The Session State Table (SST) 42 comprises a database or other storage structure in a computer readable media, such as a memory, that is accessible to the eNodeB 14 and/or the ALGs 50. In one embodiment of the present invention, the SST 42 is configured as a table that stores data and information identifying each individual UE currently connected to the eNodeB 14, as well as connection and application flow information for each connection, and the current RRC connection state information (i.e., IDLE or CONNECTED) for each individual UE connection. As described in more detail below, the ALGs 50 will monitor the application flows, and update and modify the session information stored in the SST 42, as needed, to automatically control each individual UE 16 to switch between an IDLE state and a CONNECTED state.

The Session Management Module (SMM) 44 and the Session Control Module (SCM) 46 provide connectivity between the SST 42 and the O&M 30 and RAC 32. Particularly, network operators can access the SST 42 via the SMM 44 to provision, view, or modify the data stored in the SST 42. The SCM 46 provides connectivity for the RAC 32 so that it may utilize the data stored in the SST 42 to perform its functions, if needed.

The Session Processing Module (SPM) 48 comprises the hardware and/or software needed to generate and maintain the one or more Application Level Gateway (ALGs) 50 that monitor the UE connections, update the SST 42 accordingly, and interconnect the UE 16 to the PSCN 20. More particularly, as previously stated, the IDLE-CONNECTED state transitions in the present invention are based on the active application sessions per individual UE, rather than on one single, global timer applied to all UEs. Thus, the current session states, as well as the RRC connection states, are maintained at the SST 42 for each UE per application flow.

To monitor the application flows, the SPM 48 first instantiates an ALG 50 each time it detects a new application flow (i.e., session) for a new application type. The present invention may use any technique to detect a new application flow. For example, new TCP sessions or application flows may be identified by the presence of a SYN-bit in the first packet of the session, and the absence of an ACK-bit in the TCP flags. For UDP and other non-TCP sessions, the first packet detected is assumed to be the start of a new session. Regardless of how a new session is detected, however, the ALG 50 creates a session ID for the newly identified application flow using information from the data packet, and stores that session ID, along with other information gleaned from the data packet, as an entry for the UE 16 into the SST 42. The UE 16 is then marked as being CONNECTED to indicate that the UE is communicating data.

While the UE 16 communicates data via the UP 36, ALG 50 monitors the application data flow to detect when the session ends. Upon detecting that the session is ending (or has ended), the ALG 50 for that flow to the UE 16 updates the SST 42 to indicate that the UE 16 is IDLE. The eNodeB 14 may then signal the UE 16 to enter the IDLE state.

There are different ways to monitor the data flow to determine when a session is ending; however, in one embodiment, each ALG 50 functions according to the type of application it is monitoring. By way of example only, some applications may send express tear down messages that the ALG 50 can intercept and interpret as a session-ending event. Other applications, however, may include such information as overhead data in the packet data headers. The end of a TCP session, for example, may be detected when a FIN-bit is acknowledged by both halves of the session, or when either half of the session receives a segment with the RST-bit in the TCP flags field. In these cases, the ALG 50 may monitor the information passed in the headers, or in other parts of the associated data packets, to determine whether a particular UE should be placed in the IDLE state.

In some embodiments, the ALG 50 for a given application flow to UE 16 might also initiate a UE-specific aging timer, and control the RRC connection state for the UE 16 based on that individual timer. The aging timer may, for example, be set for a typical amount of time that the UE 16 would normally have to complete a function associated with the application. By way of example only, a given UE may require no more than 1 second to complete some function (e.g., a handoff procedure) on average. Thus, when UE 16 attempts to perform that function, the ALG 50 for the application at the eNodeB 14 would set an internal timer for 1 second. The ALG 50 should get an indication when the function is complete, at which time the ALG 50 would update the SST 42 for the UE to indicate IDLE. However, if no acknowledgement comes, the timer would expire. The ALG 50 could then simply update the SST 42 to show the UE 16 in the IDLE state.

The ability to proactively control the RRC connection states of the UEs individually based on an application flow allows the eNodeB 14 to perform functions that conventionally configured eNodeBs cannot perform. For example, the eNodeB 14 configured according to the present invention can proactively control a given UE to enter a CONNECTED (or IDLE) state based on a time of day, type of UE, or application type. For example, a UE associated with a TCP session may be forced to the IDLE state immediately after detecting a TCP Reset message so long as there are no other active sessions for the same UE. However, UEs associated with other types of application flows may be configured to wait for an aging timer to expire. Controlling the RRC connection states for the UE in such a manner helps reduce control plane loading.

In one particular embodiment, the eNodeB 14 can proactively control selected UEs to enter a CONNECTED state at a predetermined time, or periodically at a predetermined frequency. By way of example, an ALG 50 for an email program may be instantiated at the eNodeB 14 (there may also be other ALGs 50 instantiated for corresponding different application flows, such as those associated with news feeds, presence, etc.). The ALG 50 for the email program would have access to information that specifies the interval at which user devices poll for incoming messages (e.g., every five minutes), and thus, could use this information to proactively control individual UEs to switch to the CONNECTED state at staggered times. The ability to control the UEs in this manner allows the eNodeB 14 to "shape" or "smooth" system loading.

Such shaping benefits the system because it helps to prevent spikes in the allocation of resources. Additionally, it helps to ensure that only those UEs that are actually communicating data are in the CONNECTED state. Those UEs that are not actually communicating data, but are still in the CONNECTED state, do not need the resources. Thus, controlling these UEs to enter the IDLE state, instead of waiting on the expiration of a global timer, as is conventional, results in a more judicious use of power resources for the UEs. Additionally, it causes the system to release most of the resources for allocation to other UEs that do need the resources, thereby increasing link capacity.

Figure 3:
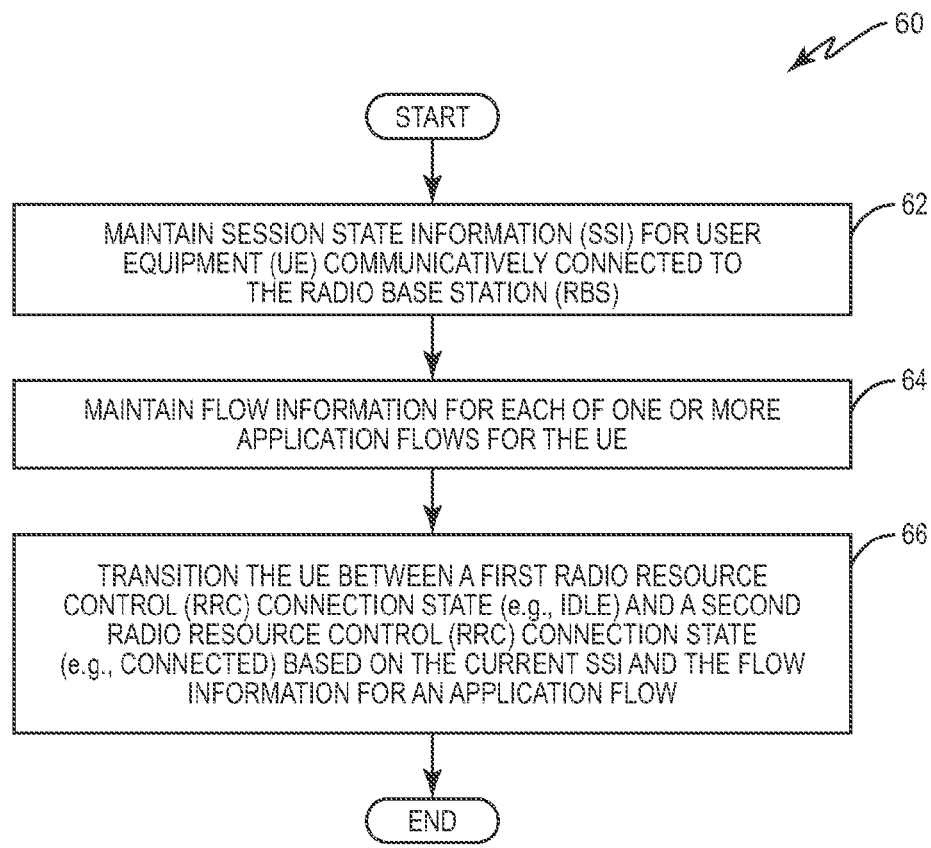
FIG. 3 is a flow diagram of a method for proactively managing the state transitions of an individual User Equipment (UE) according to one embodiment of the present invention.

FIG. 3 is a flow diagram illustrating a method 60 of performing one embodiment of the present invention at the eNodeB 14. As seen in FIG. 3, the eNodeB 14 is configured to maintain session state information (SSI) for each individual UE communicatively connected to the eNodeB 14 (box 62). Additionally, the eNodeB 14 also maintains flow information for each individual application flow for each UE (box 64). On average, it is expected that there will be 2-3 application flows for each UE; however, those skilled in the art will readily appreciate that this average is not limiting, and that the present invention may maintain information for more, or fewer, application flows as needed or desired. As stated above, the eNodeB 14 monitors each of these application flows for each of the UEs. Based on the flow information for a given application flow associated with a given UE, and on the current SSI of the UE, the eNodeB 14 controls the transition of the given UE between the IDLE state and the CONNECTED state (box 66).

Figure 4:
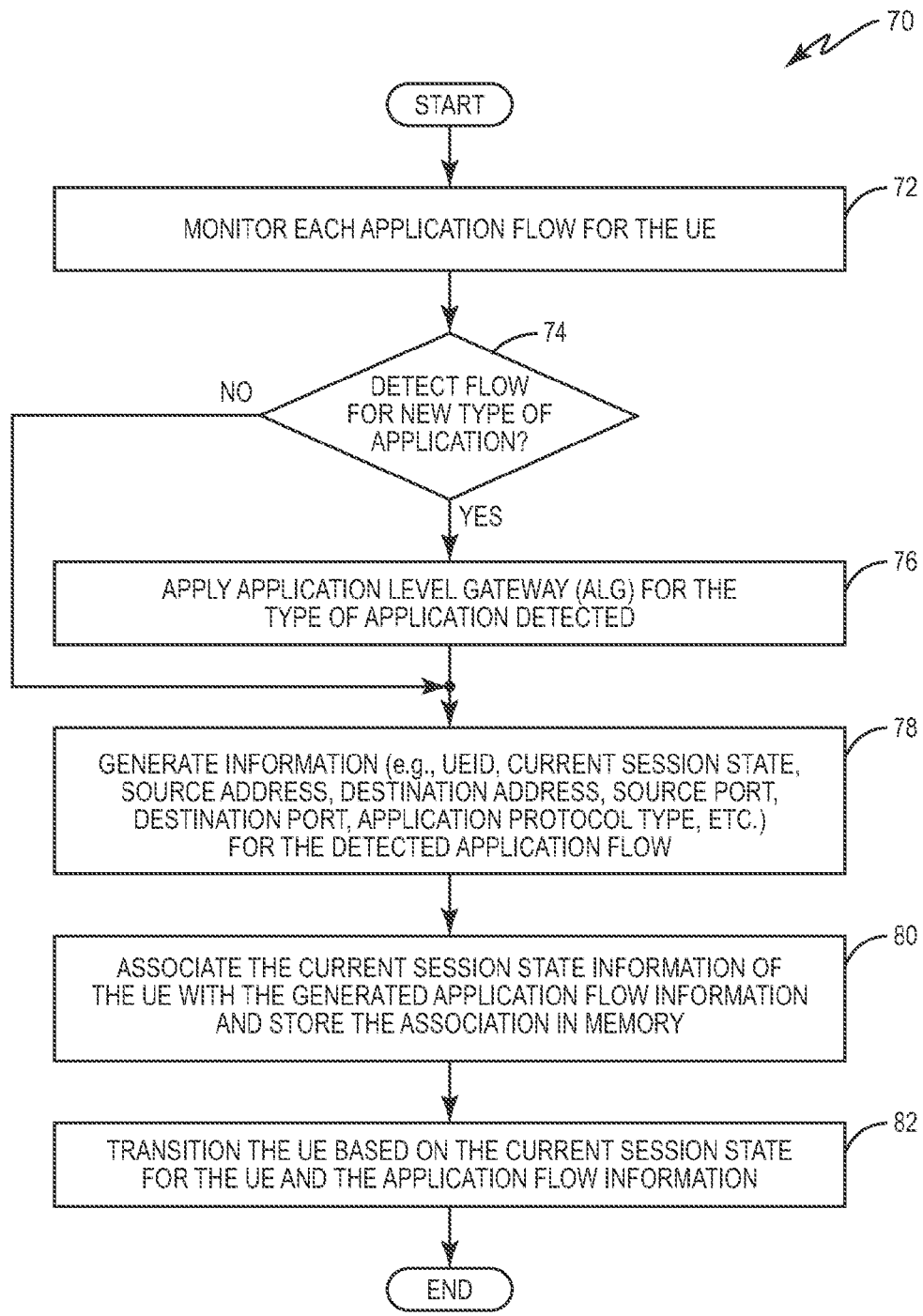
FIG. 4 is a flow diagram of a method for generating an application level gateway (ALG) based on detecting a new application flow associated with the UE according to one embodiment of the present invention.
Figure 5:
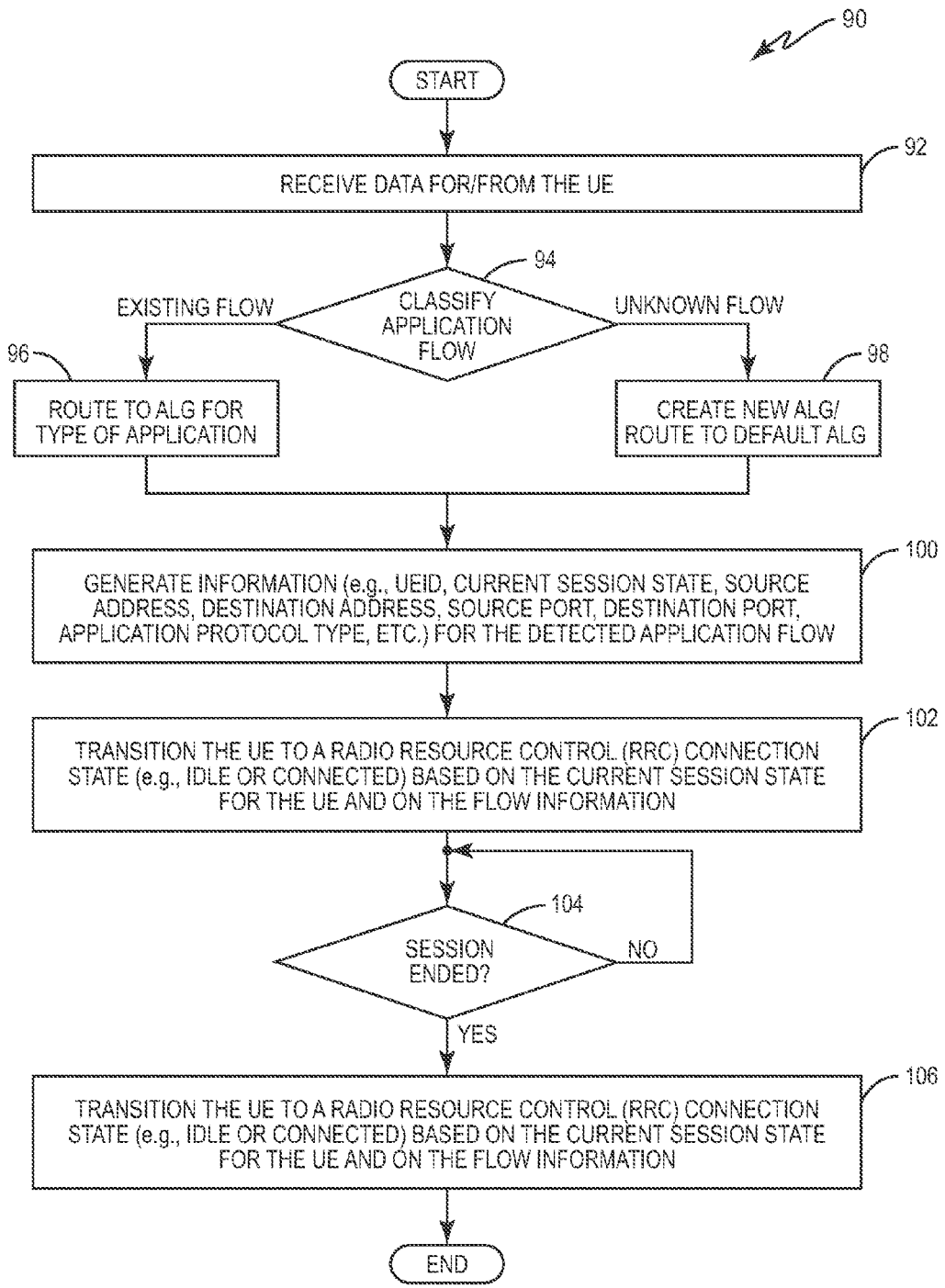
FIG. 5 is a flow diagram of a method for controlling the state transitions of an individual User Equipment (UE) according to one embodiment of the present invention.

FIGS. 4-5 are flow diagrams that illustrate how the eNodeB 14 may proactively control the RRC connection state transition of a selected UE (e.g., UE 16) in more detail. As seen in method 70 of FIG. 4, the eNodeB 14 monitors the flow of data for each application associated with UE 16 (box 72). Such applications may be, for example, email programs, or those associated with news feeds or presence updates. As stated previously, each ALG 50 is associated with a single application type. Therefore, when the eNodeB 14 detects an application flow, it checks to determine whether an ALG 50 has already been instantiated for that particular application type (box 74). If so, the eNodeB 14 generates the information needed to maintain the application flow (e.g., an ID for the UE, the current SSI of the UE, the source and/or destination addresses of a packet in the flow, the source and/or destination ports associated with the application flow, the type of protocol used, etc.) (box 78). If not, the eNodeB 14 first instantiates an ALG 50 for the type of application that was detected (76), and then generates the information for the detected flow (box 78). The eNodeB 14 then associates the current SSI of UE 16 with the generated application flow information, stores the association in the SST 42 (box 80), and transitions UE 16 based on the current SSI and the generated flow information.

As an example of the method in FIG. 4, consider a situation in which UE 16 first launches an application to access a web-based email server. The eNodeB 14, upon receiving data packets from UE 16 destined for the email server, would first determine whether an ALG 50 already existed at the eNodeB 14 for the email application. If the eNodeB 14 had previously instantiated an ALG 50 for the application (e.g., in response to an earlier connection request from UE 16 or some other UE), the eNodeB 14 would simply generate the application flow and SSI information needed for insertion into the SST 42. Otherwise, the eNodeB 14 instantiates an ALG 50 for the application, and then generates the information for insertion into the SST 42. Thereafter, as seen in FIG. 5, the eNodeB 14 can monitor the application flow for UE 16 and update the SST 42, as needed, to transition the UE 16 between RRC connection states.

Any type of information may be monitored by the ALG 50 at eNodeB 14, and generated for insertion into the SST 42. Further, the type of information that is generated may be dependent upon what type of information is available in the packets that are monitored. For example, TCP/UDP sessions may be uniquely identified by their corresponding source and destination IP addresses the source and destination TCP/UDP ports, and the protocol. Similarly, Internet Control Message Protocol (ICMP) sessions may be uniquely identified by their corresponding source and destination IP addresses and an ICMP query ID. Other sessions may be uniquely identified using the source and/or target IP addresses and associated protocol. The direction of the session may be identified by the direction of the first packet in the session.

By way of example, as seen in Table 1, one embodiment of the present invention configures the ALGs 50 at eNodeB 14 to generate an entry into the SST 42 as an index, the UE ID, the current SSI, the application/service type, the RRC connection state, a default aging timer, and a preferred action to take upon detecting the end of the associated session.

TABLE 1

| INDEX | UE ID | SSI | APPLICATION/ SERVICE TYPE | RRC CONNECTION STATE | DEFAULT AGING TIMER | ACTION |
|---|---|---|---|---|---|---|
| Src_Add + Dest_Add + Src_Port + Dest_Port + Protocol_Type | 1101 | INITIATED | Web/TCP | CONNECTED | 10 | None. Wait for Aging Timer |
| Src_Add + Dest_Add + Src_Port + Dest_Port + Protocol_Type | 1101 | ACTIVE/IN-PROGRESS | Unclassified | CONNECTED | 4 | None. Wait for Aging Timer |
| Src_Add + Dest_Add + Src_Port + Dest_Port + Protocol_Type | 1102 | TERMINATED | FTP | IDLE | 10 | Terminate Immediately |
| . | . | . . | . | . | . | . . |
| . | . | . . | . | . | . | . . |
| . | . | . . | . | . | . | . . |

Whatever the information, however, it should be such that the eNodeB 14 is able to quickly identify a particular entry for the UE 16 for that particular application flow in the SST 42 while monitoring the application flows for the UE 16.

FIG. 5 is a flow diagram illustrating how the eNodeB 14 may proactively control the RRC connection state transition of UE 16 while monitoring the individual application flows for UE 16. Method 90 begins with the eNodeB 14 receiving data packets for (or from) the UE 16 (box 92). Upon receiving the packets, the eNodeB 14 classifies the packets to determine which ALG 50 they are associated with (box 94). If the packets are associated with a known ALG 50, the eNodeB 14 routes the packets for processing by that ALG 50 (box 96). Existing application flows for a given data packet may be determined by first trying to match the information associated with the given data packet to the information associated with an existing flow stored in the memory. Otherwise, the eNodeB 14 may instantiate a new ALG 50, as previously described, or route the packets to a default ALG 50 designed to handle unclassified packets (box 98).

Once classified, the ALG 50 generates the information for the application flow (box 100). As previously described, the information may be any information needed or desired, but in one embodiment, contains the UE ID (e.g., a MEI), a source address, a destination address, a source port, a destination port, and a protocol type. The eNodeB 14 then locates the entry for the application flow for the UE 16 in the SST 42 to determine the current SSI, and transitions the UE 16 from its current RRC connection state (e.g., IDLE) to another RRC connection state (e.g., CONNECTED) (box 102). When the ALG 50 detects that the session has ended (box 104), the eNodeB 14 transitions the UE 16 back to the other RRC connection state (e.g., from CONNECTED to IDLE) in accordance with the preferred action for that SST 42 entry (box 106).

By way of example, consider a situation where UE 16 periodically polls a web server for email. Initially, the SST 42 will indicate that the UE 16 is in an IDLE state. When the UE 16 wakes to poll, however, the ALG 50 for the application used by the UE 16 will update the SST 42 to indicate that the UE 16 is CONNECTED. When polling is complete, the ALG 50 will once again update the SST 42 to show the UE 16 as IDLE.

Figure 6:
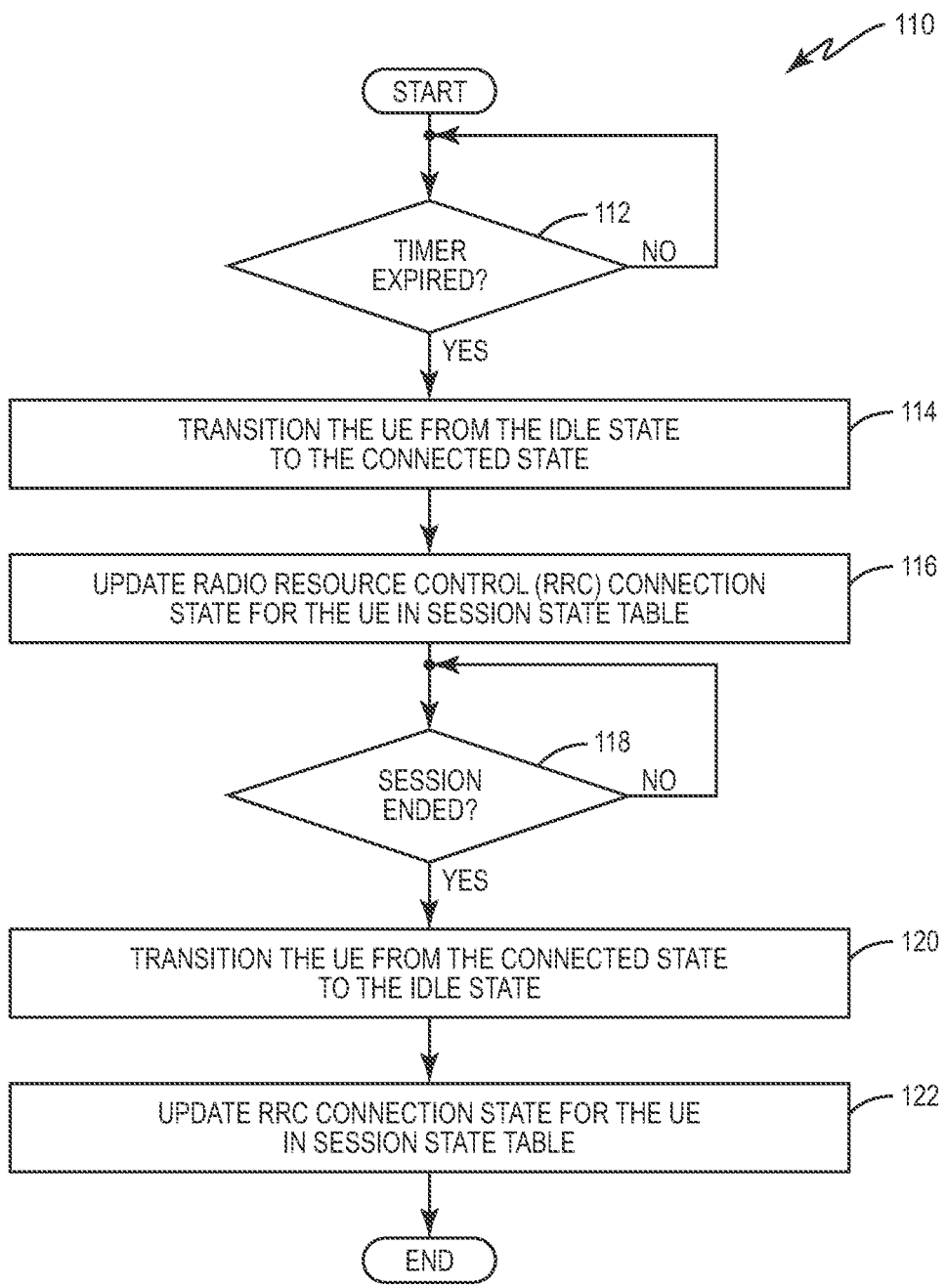
FIG. 6 is a flow diagram of a method for proactively controlling the state transitions of a UE based on a per-individual UE timer according to one embodiment of the present invention.

As stated previously, the present invention allows the eNodeB 14 to proactively control the state transitions of the UE 16 to "smooth" the loading of the control plane. FIG. 6 illustrates a method 110 of performing this function according to one embodiment.

As described above, the LG 50 for an application will have access to information that defines when a particular UE 16 must perform a specific function (e.g., wake to poll for email or read a control channel, etc.). Therefore, the ALG 50 may start a UE-specific timer for the application flow that is set to a predetermined time (e.g., 10 minutes). The ALG 50 monitors this timer (box 112) and when it expires, the ALG 50 transitions the UE 16 from the IDLE state to the CONNECTED state so that the UE 16 can perform its function (box 114). The eNodeB 14 also updates the RRC connection state in the SST 42 for the application flow/UE combination to reflect the transition to the CONNECTED state (box 116). The eNodeB 14 continues to monitor the application flow for UE 16 and, when it detects that the session has ended (box 118), transitions the UE back to the IDLE state (box 120) and updates the RRC connection state in the SST 42 (box 122).

Figure 7:
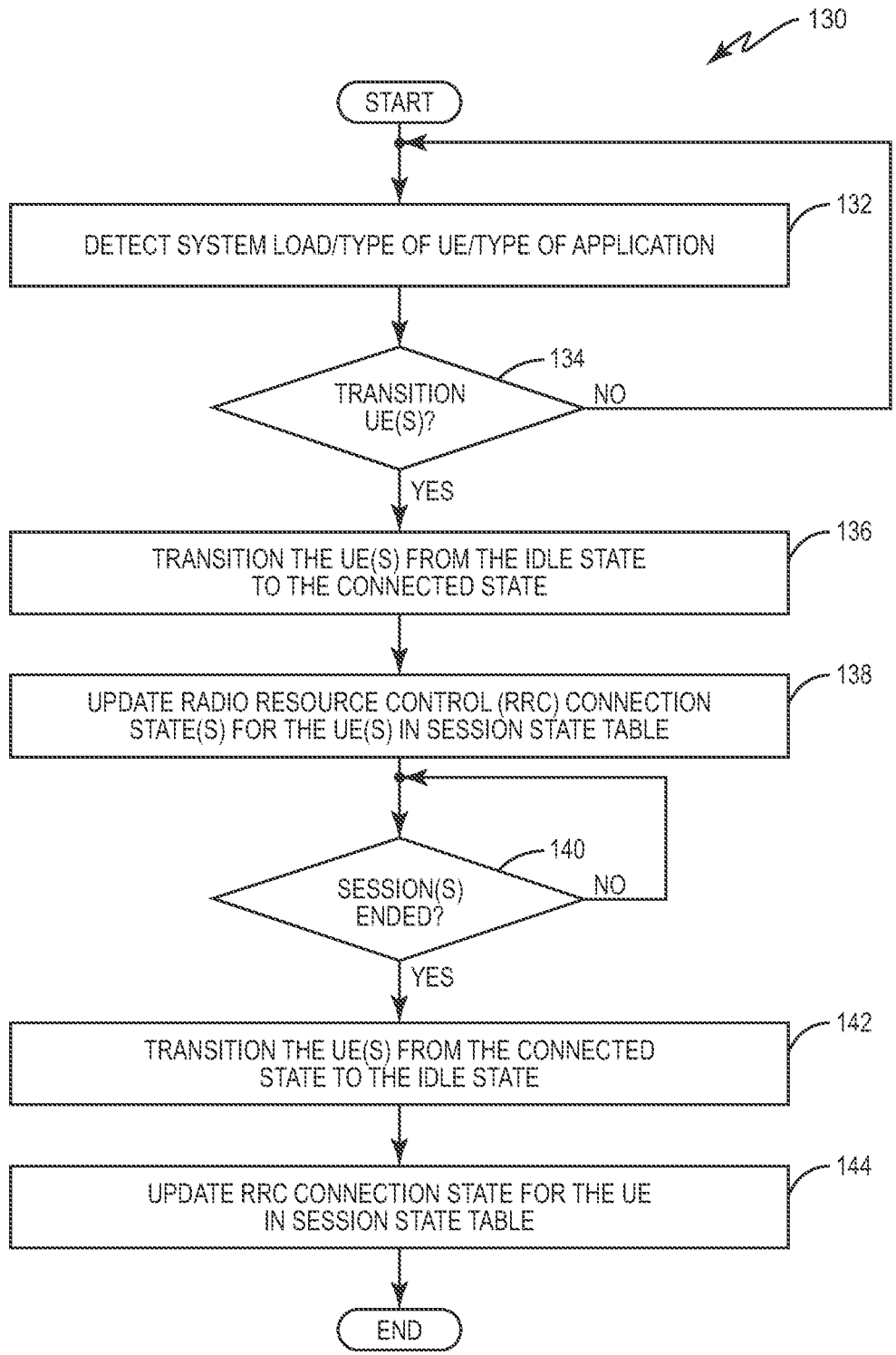
FIG. 7 is a flow diagram of a method for proactively controlling the state transitions of a UE based on alternate criteria, such as system loading, type of UE, and application type, according to one or more embodiments of the present invention.

FIG. 7 illustrates another method 130 by which the eNodeB 14 can smooth system loading based on other criteria. Particularly, the eNodeB 14 may be configured to monitor and detect a current system load, or the type of UE, or the type of application (box 132). If one or more of these parameters reaches or exceeds a predetermined threshold (e.g., the system load exceeds a certain percentage), the eNodeB 14 makes a determination to transition one or more selected UEs (box 134). If the eNodeB 14 determines that one or more UEs should be transitioned, the eNodeB 14 generates and sends the command to the UE to transition from its current state (e.g., IDLE) to another state (e.g., CONNECTED) (box 136) and updates the SST for the application flow/UE combination (box 138). The eNodeB 14 continues to monitor the application flow for UE 16 and, when it detects that the session has ended (box 140), transitions the UE back to the IDLE state (box 142) and updates the SST 42 (box 144).

Figure 8:
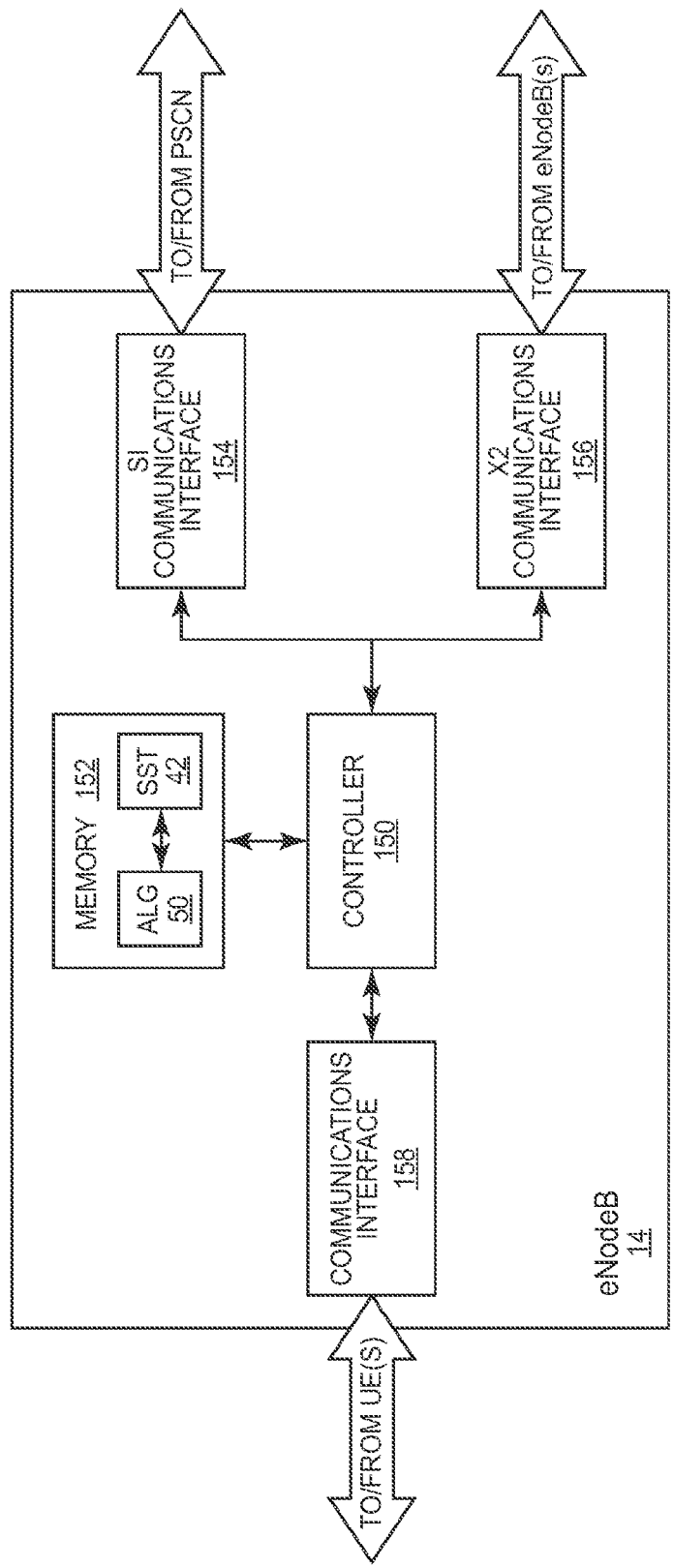
FIG. 8 is a functional block diagram illustrating some components of an eNodeB configured according to one embodiment of the present invention.

FIG. 8 is a block diagram that illustrates some components and circuits that may comprise an eNodeB 14 configured according to the present invention. As seen in FIG. 8, the eNodeB 14 comprises a programmable controller 150 operatively connected to a memory 152, an S1 communications interface 154, an X2 communications interface 156, and a communications interface 156 that allows the eNodeB 14 to communicate wirelessly with the UE 16.

The controller 150, memory 152, and interfaces 154, 156, and 158 may comprise any hardware and/or software modules as described above for corresponding functionality in the eNodeB 14. The memory 152 may comprise solid state memory (e.g, ROM, DRAM, Flash and the like), and/or any device capable of reading computer readable media, such as optical media, for example. Memory 152 is operative to store computer program code, such as the ALG 50 and SST 42, containing instructions operative to cause the controller 150 to proactively control the transitions of individual UEs between RRC connection states based on individual application flows for each UE.

The S1 and X2 communication interfaces 154, 156, as previously stated, communicatively connect the eNodeB 14 to the PSCN 20, and to other eNodeBs in RAN 12. The other communications interface 158 may comprise a transceiver operative to transmit and receive signals to and from UEs in the RAN 12 via one or more antenna(s) according to a known wireless communication protocol, such as 3GPP LTE. Of course, in other embodiments, the transceiver may operate according to code division multiple access (CDMA) protocols (e.g., UTRA, CDMA2000, WCDMA), global system for mobile communications (GSM), worldwide interoperability for microwave access (WiMAX), and/or other well-known wireless communication protocols.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method for managing connection state transitions in a wireless communications network, the method performed at a radio base station (RBS) and comprising:
    maintaining session state information (SSI) for a user equipment (UE) communicatively connected to the RBS;
    maintaining flow information for each of one or more application flows for the UE; and
    transitioning the UE between a first Radio Resource Control (RRC) connection state and a second RRC connection state based on the current SSI and the flow information for an application flow, and independently of an inactivity timer;
    monitoring each of the one or more application flows for the UE; and
    generating the flow information responsive to detecting the application flow;
    wherein monitoring each of the one or more application flows for the UE comprises:
        classifying each of the one or more application flows to identify an application type for each application flow, and to track a corresponding session state;
        providing an application level gateway for each application type to monitor the application flows; and
        providing a default application level gateway to monitor application flows that are not classified.

2. The method of claim 1 wherein maintaining session state information for a UE comprises storing an identity and a current session state for the UE in a memory accessible to the RBS.

3. The method of claim 2 wherein maintaining flow information for each of the one or more application flows comprises storing one or more of a source address, a destination address, a source port, a destination port, and a protocol type for each of the one or more application flows in the memory.

4. The method of claim 3 further comprising associating the flow information for each application flow with the SSI for the UE.

5. The method of claim 1 wherein transitioning the UE between the first and second RRC connection states comprises periodically transitioning the UE based on a type of application that is associated with the application flow, or responsive to a change in the session state for the application flow.

6. The method of claim 5 wherein periodically transitioning the UE comprises transitioning the UE between the first and second RRC connection states at predetermined intervals.

7. The method of claim 5 wherein periodically transitioning the UE comprises transitioning the UE between the first and second RRC connection states at dynamically determined predetermined intervals.

8. The method of claim 1 wherein transitioning the UE between a first RRC connection state and a second RRC connection state further comprises transitioning the UE based on a determined system load.

9. The method of claim 1 wherein transitioning the UE between a first RRC connection state and a second RRC connection state further comprises transitioning the UE based on a determined time of day.

10. The method of claim 1 wherein transitioning the UE between a first RRC connection state and a second RRC connection state further comprises transitioning the UE based on a type of U E.

11. The method of claim 1 wherein transitioning the UE between a first RRC connection state and a second RRC connection state comprises transitioning the UE from an IDLE state to a CONNECTED state responsive to detecting the application flow at the RBS.

12. The method of claim 1 wherein transitioning the UE between a first RRC connection state and a second RRC connection state comprises transitioning the UE from a CONNECTED state to an IDLE state responsive to detecting that a session associated with the application flow has ended.

13. The method of claim 1 further comprising:
    configuring an aging timer for each of the one or more application flows for the UE; and
    transitioning the UE from a CONNECTED state to an IDLE state responsive to detecting expiration of the aging timer.

14. A radio base station (RBS) in a wireless communications network, the RBS comprising:
    a communications interface configured to transmit signals to and receive signals from a plurality of user equipment (UEs);
    a controller circuit configured to:
        maintain session state information (SSI) in a memory for a UE communicatively connected to the RBS via the communications interface;
        maintain flow information in the memory for each of one or more application flows for the UE; and
        transition the UE between a first RRC connection state and a second RRC connection state based on the current SSI and the flow information for an application flow, and independently of an inactivity timer;
        monitor each of the one or more application flows for the UE; and generate the flow information responsive to detecting the application flow; and wherein the controller circuit is further configured to:
classify each of the one or more application flows to identify an application type for each application flow, and to track a corresponding session state for each of the one or more application flows;
control an application level gateway for each application type to monitor the application flows; and
control a default application level gateway to monitor application flows that are not classified.

15. The radio base station of claim 14 wherein the controller circuit is further configured to:
store an identity and a current session state for the UE in the memory;
store one or more of a source address, a destination address, a source port, a destination port, and a protocol type for each of the one or more application flows in the memory; and
associate the flow information for each application flow with the SSI for the UE.

16. The radio base station of claim 14 wherein the controller circuit is further configured to periodically transition the UE between RRC connection states based on a type of application that is associated with the application flow, or responsive to a change in the session state for the application flow.

17. The radio base station of claim 14 wherein the controller circuit is further configured to transition the UE from the first RRC connection state to the second RRC connection state responsive to detecting the application flow at the RBS.

18. The radio base station of claim 14 wherein the controller circuit is further configured to transition the UE from the first RRC connection state to the second RRC connection state responsive to detecting that a session associated with the application flow has ended.

19. The radio base station of claim 14 wherein the controller circuit is further configured to:
configure an aging timer for each of the one or more application flows for the UE; and
transition the UE from the second RRC connection state to the first RRC connection state responsive to detecting expiration of the aging timer.

20. The radio base station of claim 14 wherein the first RRC connection state is an IDLE state, and wherein the second RRC connection state is a CONNECTED state.

21. A non-transitory computer readable medium having a program stored thereon that, when executed by a controller circuit in a radio base station (RBS), causes the RBS to:
maintain session state information (SSI) in a memory accessible to the RBS for a user equipment (UE) communicatively connected to the RBS;
maintain flow information in the memory for each of one or more application flows for the UE; and
transition the UE between a first RRC connection state and a second RRC connection state based on the current SSI and the flow information for an application flow, and independently of an inactivity timer;
monitor each of the one or more application flows for the UE; and
generate the flow information responsive to detecting the application flow; and
wherein the program is further configured to cause the RBS to:
classify each of the one or more application flows to identify an application type for each application flow, and to track a corresponding session state for each of the one or more application flows;
control an application level gateway for each application type to monitor the application flows; and
control a default application level gateway to monitor application flows that are not classified.

22. The computer readable medium of claim 21 wherein the program is further configured to cause the RBS to:
store an identity and a current session state for the UE in the memory;
store one or more of a source address, a destination address, a source port, a destination port, and a protocol type for each of the one or more application flows in the memory; and
associate the flow information for each application flow with the SSI for the UE.

23. The computer readable medium of claim 21 wherein the program is further configured to cause the RBS to periodically transition the UE based on a type of application that is associated with the application flow, or responsive to a change in the session state for the application flow.

24. The computer readable medium of claim 21 wherein the program is further configured to cause the RBS to transition the UE from the IDLE state to the CONNECTED state responsive to detecting the application flow at the RBS.

25. The computer readable medium of claim 21 wherein the program is further configured to cause the RBS to transition the UE from the CONNECTED state to the IDLE state responsive to detecting that a session associated with the application flow has ended.

26. The computer readable medium of claim 21 wherein the program is further configured to cause the RBS to:
configure an aging timer for each of the one or more application flows for the UE; and
transition the UE from the CONNECTED state to the IDLE state responsive to detecting expiration of the aging timer.

27. A session processing circuit comprising:
circuitry configured to maintain session state information (SSI) for a user equipment (UE) communicatively connected to the RBS;
circuitry configured to maintain flow information for each of one or more application flows for the UE; and
circuitry configured to transition the UE between a first RRC connection state and a second RRC connection state based on the current SSI and the flow information for an application flow, and independently of an inactivity timer;
circuitry configured to monitor each of the one or more application flows for the UE;
circuitry configured to generate the flow information responsive to detecting the application flow;
circuitry configured to classify each of the one or more application flows to identify an application type for each application flow, and to track a corresponding session state for each of the one or more application flows;
circuitry configured to control an application level gateway for each application type to monitor the application flows; and
circuitry configured to control a default application level gateway to monitor application flows that are not classified.

28. The session processing circuit of claim 27 wherein the first state is an IDLE state, and wherein the second state is a CONNECTED state.

* * * * *